(12) United States Patent
Uehara

(10) Patent No.: US 8,974,572 B2
(45) Date of Patent: Mar. 10, 2015

(54) METHOD AND APPARATUS FOR RECOVERING RARE METAL

(71) Applicant: Haruo Uehara, Saga (JP)

(72) Inventor: Haruo Uehara, Saga (JP)

( * ) Notice: Subject to any disclaimer, the term of this patent is extended or adjusted under 35 U.S.C. 154(b) by 97 days.

(21) Appl. No.: 13/655,625

(22) Filed: Oct. 19, 2012

(65) Prior Publication Data

US 2013/0089477 A1    Apr. 11, 2013

Related U.S. Application Data

(63) Continuation of application No. PCT/JP2011/059840, filed on Apr. 21, 2011.

(30) Foreign Application Priority Data

Apr. 21, 2010   (JP) ................................. 2010-098090

(51) Int. Cl.
| | | |
|---|---|---|
| *C22B 3/00* | (2006.01) | |
| *C22B 3/10* | (2006.01) | |
| *C22B 3/24* | (2006.01) | |
| *C22B 3/42* | (2006.01) | |
| *C22B 11/06* | (2006.01) | |

(52) U.S. Cl.
CPC .................. *C22B 11/042* (2013.01); *C22B 3/10* (2013.01); *C22B 3/24* (2013.01); *C22B 3/42* (2013.01); *C22B 11/04* (2013.01); *C22B 11/06* (2013.01)
USPC .............................................. 75/744; 423/22

(58) Field of Classification Search
None
See application file for complete search history.

(56) References Cited

U.S. PATENT DOCUMENTS 2,981,694 A * 4/1961 Engel .............................. 502/37
7,513,931 B2 * 4/2009 Thomas .......................... 75/723

FOREIGN PATENT DOCUMENTS

| JP | 57-155333 A | 9/1982 |
|---|---|---|
| JP | 6-136465 A | 5/1994 |
| JP | 8-176692 A | 7/1996 |
| JP | 11-152592 A | 6/1999 |
| JP | 2000-192167 A | 7/2000 |
| JP | 2009-517548 A | 4/2009 |

* cited by examiner

*Primary Examiner* — Steven Bos
(74) *Attorney, Agent, or Firm* — Dingman, McInnes & McLane, LLP

(57) ABSTRACT

Disclosed is a method and apparatus for recovering rare metal, which separates and collects rare metals by making use of chemical actions in an efficient combination of adsorption and separation, thereby reducing work load and improving work safety. The method for recycling rare metals includes a leaching step in which a rare metal of palladium, platinum, and rhodium is mixed with hydrochloric acid into a hydrochloric acid mixture, which is then stirred at one atmospheric pressure or lower at a temperature from 50 to 90 degrees Centigrade. The vapor resulting from the stirring is condensed, and the hydrochloric acid resulting from the condensing is fed back to the original hydrochloric acid mixture to produce a hydrochloric acid leaching solution. The hydrochloric acid leaching solution produced in the leaching step is used to collect the rare metals.

7 Claims, 8 Drawing Sheets

METHOD AND APPARATUS FOR RECOVERING RARE METAL

RELATED APPLICATIONS

This patent application is a continuation of International Application No. PCT/JP2011/059840, filed on Apr. 21, 2011, entitled, "System and Method for Recycling Rare Metals," which claims priority to Japanese Patent Application No. 2010-098090, filed on Apr. 21, 2010, the contents and teachings of each of which are hereby incorporated by reference in their entirety.

FIELD

The present invention relates to a rare metal recovery method for recovering rare metal and an apparatus for such a recovery, and especially to a rare metal recovery method, which utilizes resin columns and acidic aqueous solutions in combination to permit a separation recovery of a plurality of rare metals, as well as an apparatus for such a recovery.

BACKGROUND

Rare metals such as rare non-ferrous metals, have been widely used in constructional materials, electronic material/magnetic materials, functional materials, etc. A value of the rare metal has become a point of focus, along with miniaturization and high performance, of recent electronic components. Countries producing the rare metals are concentrated, and it is therefore desirable to provide effective recycling of the rare metals, especially in resource-limited countries.

In these situations, a ceramic base material, such as used in a muffler of an automobile, a thermal power plant, a garbage incineration plant, etc., contains waste catalyst including rare metals such as palladium (Pd), platinum (Pt) and rhodium (Rh). A method for recovering rare metals from the waste catalyst with a high accuracy is a part of a conventional high temperature refining process. However, an effective method for recovering rare metals by a low temperature refining process has not as yet been established.

In a conventional rare metal recovery method, a waste fluorescent material containing rare metal components is first subject to a low degree mechanochemical treatment to elute components of yttrium (Y) and europium (Eu) in a weak acid, and subsequently subject to a high degree mechanochemical treatment to elute components of lanthanum (La), cerium (Ce) and terbium (Tb) in a weak acid to selectively separate the rare metal components (see Japanese Patent Provisional Publication No. 2000-192167).

SUMMARY

In the conventional rare metal recovery method, a mechanochemical treatment is applied by which the whole of material, including rare metal components, is roughly broken utilizing mechanical energy. Accordingly, the number of steps is increased, along with the application of an external force, thus increasing workload and increasing the risk of danger during operation.

An object of the present invention, which was made to solve the above-mentioned problems, is to provide a rare metal recovery method in which leaching, adsorption, and elution, utilizing chemical actions, are effectively applied. The method is performed without the need for external mechanical when separating and recovering the rare metal, thus controlling workload and enhancing the safety of operation. Another object of the invention relates to an apparatus for such a recovery.

The inventor of the present application had conducted an extensive study to obtain a finding of a rare metal recovery method, which permits control of the workload and environment load, as well as a separation recovery of rare metals with a high level of safety by effectively applying leaching, adsorption and elution utilizing chemical actions.

A rare metal recovery method according to the present invention comprises: a leaching step comprising: mixing, under a pressure of 1 atmosphere or less at a temperature of from 50° C. to 90° C., a hydrochloric acid mixture liquid obtained by mixing a waste material of rare metal comprising palladium, platinum and rhodium with hydrochloric acid; condensing steam obtained by the mixing; and flowing hydrochloric acid obtained by the condensing back to the hydrochloric acid mixture liquid to prepare a hydrochloric acid leaching liquid; and a step of utilizing the hydrochloric acid leaching liquid obtained by the leaching step to recover the rare metal.

According to the rare metal recovery method of the present invention, the leaching step comprises: mixing, under a pressure of 1 atmosphere or less at a temperature of from 50° C. to 90° C., a hydrochloric acid mixture liquid obtained by mixing a waste material of rare metal comprising palladium, platinum and rhodium with hydrochloric acid; condensing steam obtained by the mixing; and flowing hydrochloric acid obtained by the condensing back to the hydrochloric acid mixture liquid to prepare a hydrochloric acid leaching liquid. It is therefore possible to always supply hydrochloric acid, which has a high purity (virgin) obtained through vaporization and boiling of the hydrochloric acid, to the leaching step, thus permitting to decrease the leaching time of the rare metal in comparison with a conventional method. In addition, it is possible to cause the rare metals to leach with the use of only the hydrochloric acid having a high concentration, thus leading to no need to use any oxidation agent in the similar manner to the conventional method, and permitting reduction in environment load and costs.

The rare metal recovery method according to the present invention may comprise, where appropriate, a palladium adsorption step of causing the hydrochloric acid leaching liquid obtained by the leaching step to pass through a palladium adsorbent impregnated with adsorbent for adsorbing the palladium and causing the palladium to adsorb on the palladium adsorbent; a platinum adsorption step of causing a residual liquid from the palladium adsorption step to pass through a platinum adsorbent impregnated with adsorbent for adsorbing the platinum and causing the platinum to adsorb on the platinum adsorbent; and a rhodium adsorption step of causing a residual liquid from the platinum adsorption step to pass through a rhodium adsorbent impregnated with adsorbent for adsorbing the rhodium and causing the rhodium to adsorb on the rhodium adsorbent.

According to the rare metal recovery method of the present invention, the palladium adsorption step causes the hydrochloric acid leaching liquid obtained by the leaching step to follow through the palladium adsorbent to cause the palladium to adsorb thereon, the platinum adsorption step causes the residual liquid from the palladium adsorption step and the above-mentioned hydrochloric acid solution to pass through the platinum adsorbent to cause the platinum to adsorb thereon; and the rhodium adsorption step causes the residual liquid from the platinum adsorption step to pass through the rhodium adsorbent to cause the rhodium to adsorb thereon. It is therefore possible to cause the different rare metals to separate and adsorb on the different resins in a stepwise manner only by causing the liquid including the rare metals to pass through the respective resins, thus permitting an effective separation and recovery of the rare metals.

The rare metal recovery method of the present invention may comprise a hydrochloric acid reuse step of condensing a residual liquid from the rhodium adsorption step; and flowing a hydrochloric acid solution obtained by the condensing back to the hydrochloric acid mixture liquid.

According to the rare metal recovery method of the present invention, the hydrochloric acid reuse step causes the hydrochloric acid solution, which has been obtained by condensing the residual liquid from the rhodium adsorption step, to flow back to the hydrochloric acid mixture liquid. It is therefore possible to always supply hydrochloric acid, which has a higher purity obtained through the condensation, to the leaching step, thus permitting a further decrease in the leaching time of the rare metal compared to conventional methods. In addition, the recycling of the hydrochloric acid may decrease an amount of the hydrochloric acid as required, thus leading to decrease in costs for recovery of the rare metal.

The rare metal recovery method according to the present invention may comprise, where appropriate, a palladium elution step of causing a hydrochloric acid solution containing thiourea to pass through the palladium adsorbent and eluting the palladium to prepare a palladium elution liquid including the palladium; a platinum elution step of causing a hydrochloric acid solution to pass through the platinum adsorbent and eluting the platinum to prepare a platinum elution liquid including the platinum; and a rhodium elution step of causing a hydrochloric acid solution to pass through the rhodium adsorbent and eluting the rhodium to prepare a rhodium elution liquid including the rhodium.

According to the rare metal recovery method of the present invention, the palladium elution step causes the hydrochloric acid solution containing thiourea to pass through the palladium adsorbent and causes the palladium to be eluted to prepare the palladium elution liquid including the palladium. The platinum elution step causes the hydrochloric acid solution to pass through the platinum adsorbent and causes the platinum to be eluted to prepare the platinum elution liquid including the platinum. The rhodium elution step causes the hydrochloric acid solution to pass through the rhodium adsorbent and causes the rhodium to be eluted to prepare the rhodium elution liquid including the rhodium. It is therefore possible to obtain the respective elution liquids in which the respective rare metals are separated in ionic state, permitting an easy recovery of the respective rare metals from the rare metal elution with high separation accuracy.

The rare metal recovery method, according to the present invention may comprise, where appropriate, a palladium precipitation step of adding a sodium hydroxide solution to the palladium elution liquid obtained by the palladium elution step to precipitate a palladium oxide; a platinum precipitation step of adding a saturated ammonium chloride solution to the platinum elution liquid obtained by the platinum elution step to precipitate a platinum oxide; and a rhodium precipitation step of adding a nitrous acid solution to the rhodium elution liquid obtained by the rhodium elution step to precipitate a rhodium oxide.

According to the rare metal recovery method of the present invention, the palladium precipitation step causes the sodium hydroxide solution to be added to the palladium elution liquid obtained by the palladium elution step to precipitate the palladium oxide, the platinum precipitation step causes the saturated ammonium chloride solution to be added to the platinum elution liquid obtained by the platinum elution step to precipitate the platinum oxide, and the rhodium precipitation step causes the nitrous acid solution to be added to the rhodium elution liquid obtained by the rhodium elution step to precipitate the rhodium oxide. It is therefore possible to obtain the respective rare metals as separated in the form of precipitates with a high accuracy, by utilizing solutions offered commercially, thus permitting an easy recovery of the rare metals in the form of solid from which the rare metal may be easily recovered.

DETAILED DESCRIPTION

A description will now be given below of the rare metal recovery method of the present invention for each step, with reference to FIGS. 1 to 4.

Figure 1:
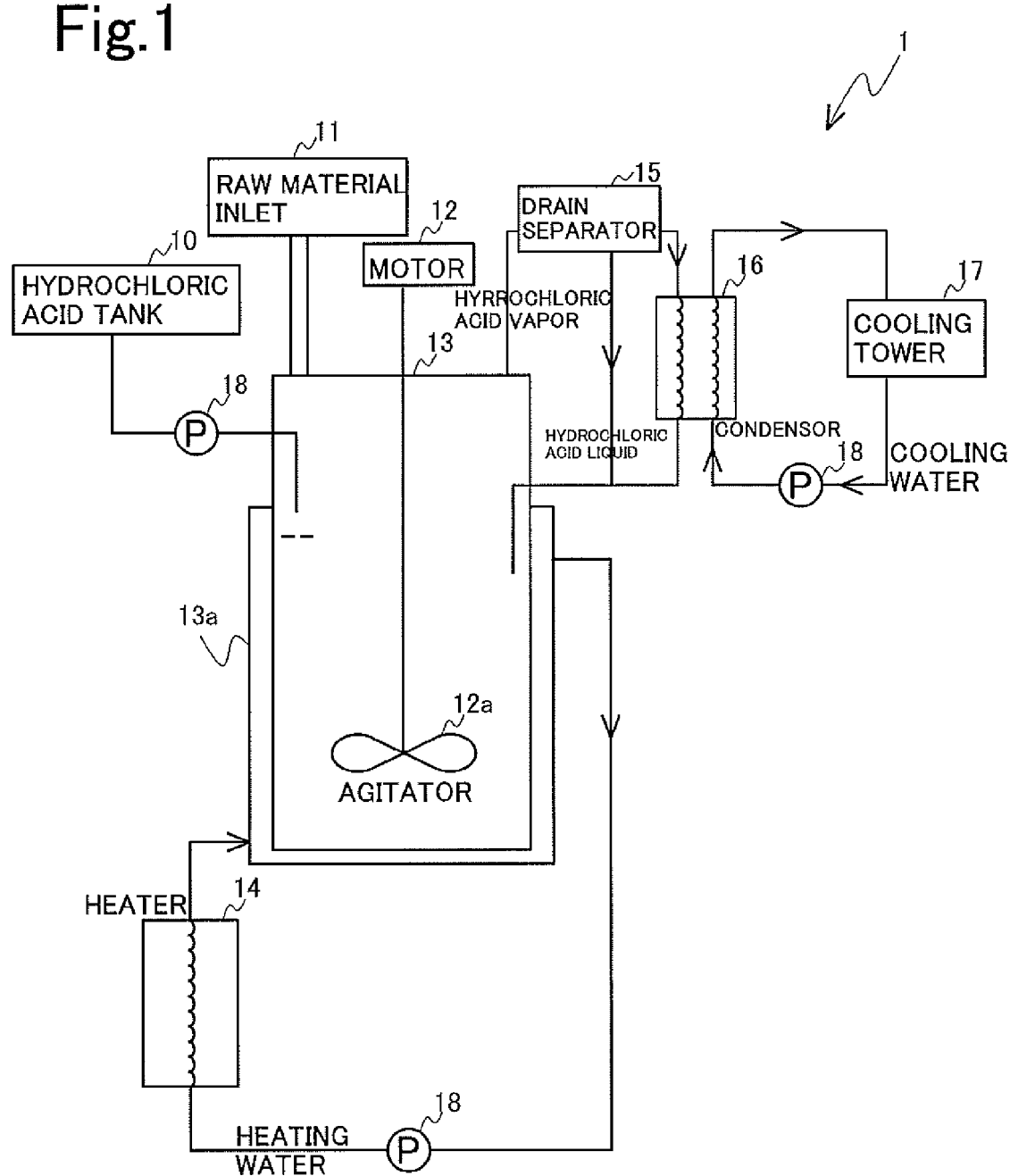
FIG. 1 is a schematic descriptive view of a leaching unit according to a rare metal recovery method of the present invention.
Figure 2:
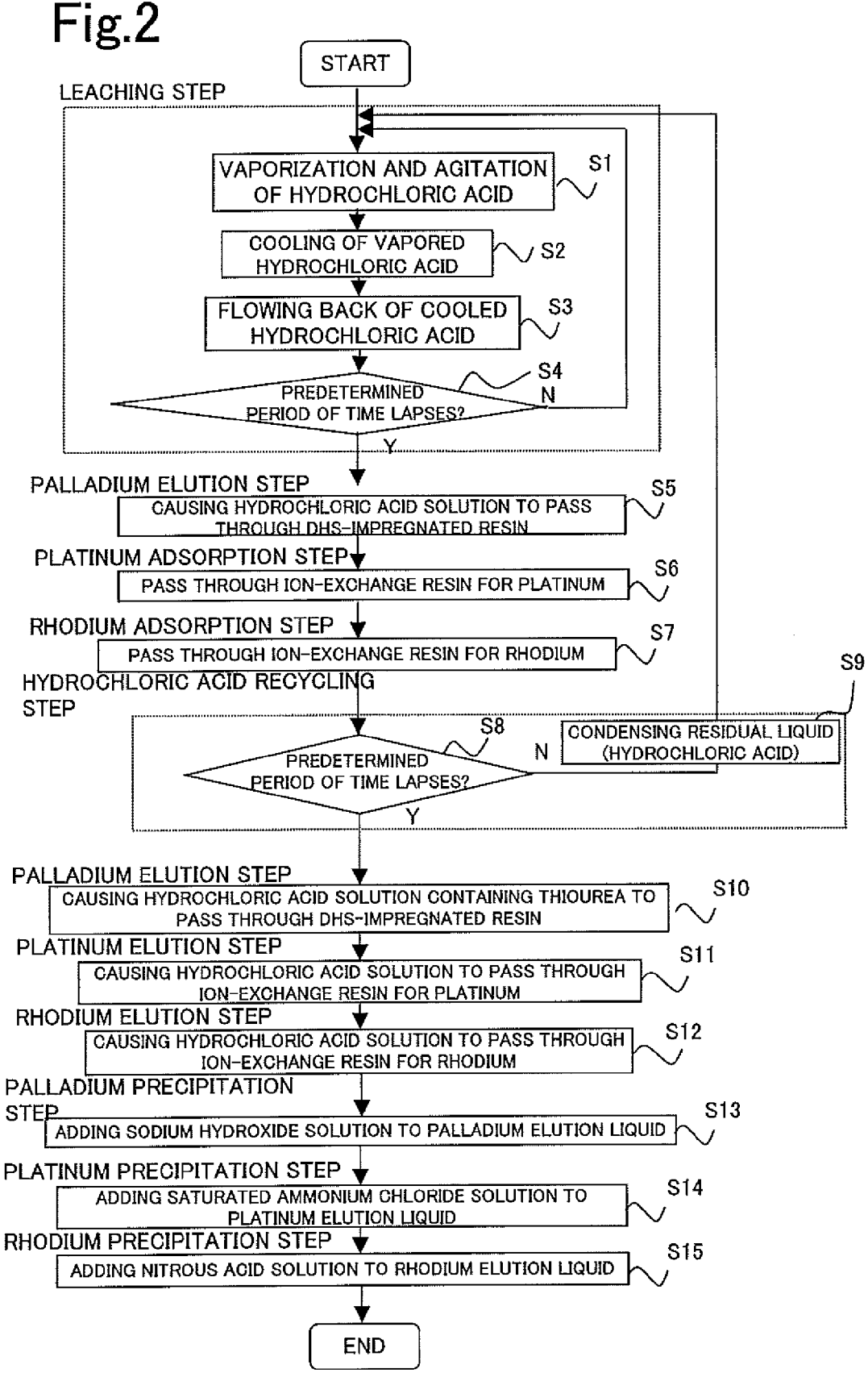
FIG. 2 is a flowchart of the rare metal recovery method of the present invention.
Figure 3:
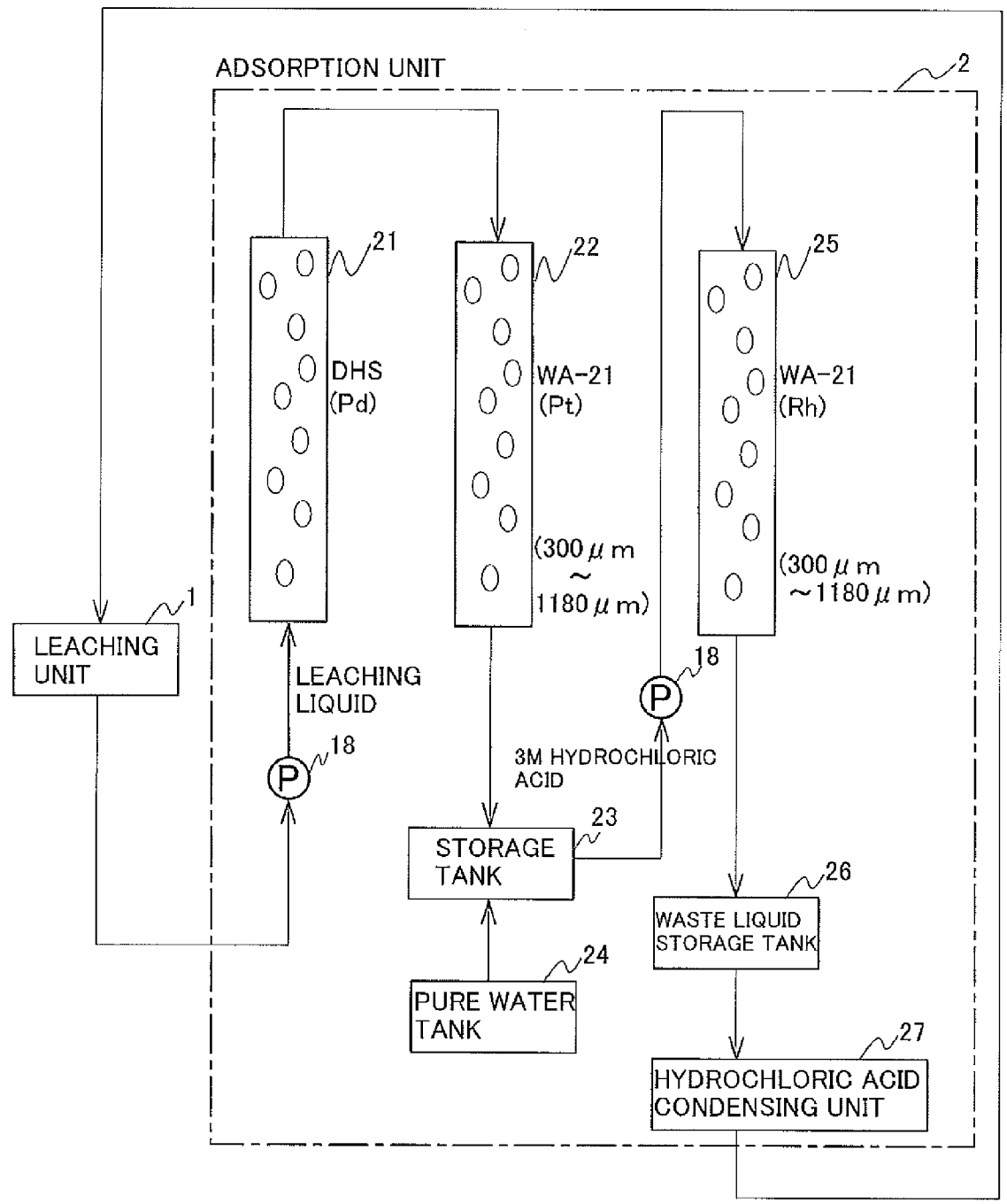
FIG. 3 is a schematic descriptive view of an adsorption unit according to the rare metal recovery method of the present invention.
Figure 4:
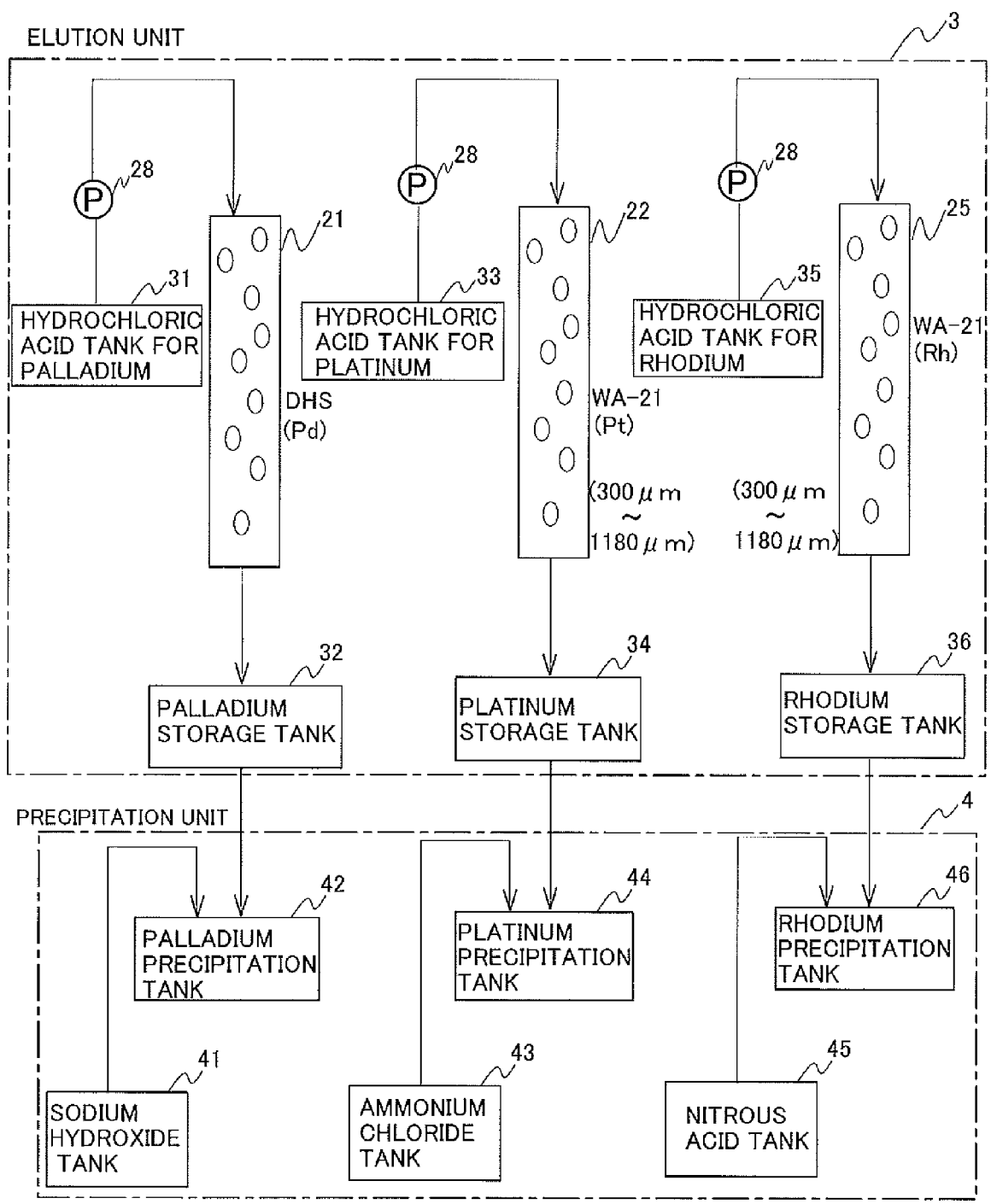
FIG. 4 is a descriptive view of an elution unit and a precipitation unit according to the rare metal recovery method of the present invention.

FIG. 1 is a schematic descriptive view of a leaching unit according to a rare metal recovery method of the present invention, FIG. 2 is a flowchart of the rare metal recovery method as shown in FIG. 1, FIG. 3 is a schematic descriptive view of an adsorption unit according to the rare metal recovery method as shown in FIG. 1, and FIG. 4 is a descriptive view of an elution unit and a precipitation unit according to the rare metal recovery method as shown in FIG. 1.

Leaching Step

The leaching unit used in the leaching step, which constitutes the rare metal recovery method according to the present invention, includes, as shown in FIG. 1, a hydrochloric acid tank 10, which stores hydrochloric acid, a raw material inlet 11 from which raw materials are to be supplied, a motor 12, an agitator 12a that performs a rotation operation by the operation of the motor 12, a leaching liquid tank 13 that accommodates the agitator 12a and stores hydrochloric acid solution in which rare metals are leached, a tank heating unit 13a that heats the leaching liquid tank 13, a heating unit 14 that heats solution, a drain separator 15 that separates and removes vapor released from the solution in the leaching liquid tank 13, a condenser 16 that condenses gas separated and removed by the drain separator 15, a cooling tower 17 that is connected to the condenser 16 to perform a cooling operation, a pressure unit 18 that applies a pressing operation to the liquid, and conduits that supplies liquid between the respective columns and/or the respective tanks.

Wing shaped plates or vibration plates formed of iron may be used in the agitator 12a. A so-called boiler, which transmits a thermal energy obtained by burning a fuel to water, may be used in the heating unit 14, but water as heated (heated water) may be used as a medium to perform the heating operation. In addition, ocean surface water having a relatively high temperature may be used as the heated water. The cooling tower 17 is a tower for cooling the cooling water, and there may be used either an open-type cooling tower in which an external air may come into direct contact with the cooling water, or a closed-type cooling tower in which an external air may not come into direct contact with the cooling water.

Description will be given of a flow of the leaching step in the structure as described above with reference to FIG. 1. Materials which contain rare metals, including palladium, platinum and rhodium (for example, as used as an adsorption catalyst for an exhaust gas treatment for an automobile), are crushed into pieces in a closed vessel and collected in the raw material inlet 11. The crushed materials are supplied from the raw material inlet 11 into the leaching liquid tank 13. Hydrochloric acid (5 mol/L~7 mol/L) is caused to flow from the hydrochloric acid tank 10 into the leaching liquid tank 13 to immerse the crushed materials into the hydrochloric acid in the leaching liquid tank 13. A heating agitation is carried out with the use of the agitator 12a in the leaching liquid tank 13, the temperature of which is kept between 50° C. and 90° C. by the tank heating unit 13a at 1 atmospheric pressure or less to prepare a hydrochloric acid leaching liquid in which the rare metals leach into the hydrochloric acid (S1).

Hydrochloric acid vapor as evaporated by this heating agitation is subjected to a vapor-liquid separation treatment by the drain separator 15, and the resultant hydrochloric acid in vapor state is condensed by the condenser 16 and cooled to liquefy it, with the use of the cooling water, which has been cooled to a temperature of from 20° C. to 25° C. by the cooling tower 17 (S2). The hydrochloric acid as cooled is then caused to flow back to the leaching liquid tank 13 (S3).

The flowing-back operation supplies the hydrochloric acid, which has a high purity (virgin) obtained through vaporization and boiling of the hydrochloric acid, to the hydrochloric acid leaching liquid as mentioned above, thus leading to a decrease in the leaching time of the rare metal in comparison with conventional methods. According to the conventional method, 72 hours are required to cause palladium, platinum and rhodium to leach into the hydrochloric acid. According to the present invention utilizing the above-mentioned hydrochloric acid leaching liquid, 12 hours were sufficient for the palladium, platinum and rhodium to leach into the hydrochloric acid leaching liquid under the same conditions, except for carrying out the above-mentioned flowing-back operation. This reveals that, according to the present invention, it is possible to carry out the leaching step about six times faster than the conventional method, thus leading to performance of the hydrochloric acid-leaching with a higher efficiency than the conventional method. In addition, it is possible to cause the rare metals to leach with the use of only the high concentration hydrochloric acid, thus eliminating the use of any other oxidation agent in a manner similar to the conventional method, and permitting reduction in environment load and costs. If an elapsed time for the steps of S1 to S3 does not reach a predetermined time (S4), a system is caused to return to the step of S1 as described above.

Palladium Adsorption Step, Platinum Adsorption Step and Rhodium Adsorption Step

An adsorption unit 2, which is used in the palladium adsorption step, the platinum adsorption step and the rhodium adsorption step by which the rare metal recovery method according to the embodiment of the present invention is comprised, includes, as shown in FIG. 3, a DHS-impregnated resin column 21 that is formed of a resin impregnated with di-n-hexyl sulfide (DHS) absorbing specifically palladium; an ion-exchange resin column 22 for platinum that is formed of an ion-exchange resin (such as WA-21) having a particle diameter of 300 μm to 1180 μm; a storage tank 23 that stores the residual liquid flowing from the ion-exchange resin column 22 for platinum; a pure water tank 24 that stores a pure water; an ion-exchange resin column 25 for rhodium that is formed of an ion-exchange resin (WA-21) having a particle diameter of 300 μm to 1180 μm; a waste fluid storage tank 26 that stores a waste fluid from the ion-exchange resin column 25 for rhodium; a hydrochloric acid condensing unit 27 that condenses and filter the hydrochloric acid stored in the waste fluid storage tank 26; the pressure unit 18 as described above; and conduits that supplies liquid between the respective columns and/or the respective tanks.

Concerning the flow of the palladium adsorption step, the platinum adsorption step and the rhodium adsorption step in the structural system as described above, in case where the lapsed time for the steps of S1 to S3 reaches a predetermined time in Step S4 as described above in FIG. 1, the concentration of the above-mentioned hydrochloric acid leaching liquid is adjusted to from 5 mol/L to 7 mol/L, and preferably to 7 mol/L and the resultant liquid is caused to flow into the DHS-impregnated resin column 21 (S5). This concentration adjustment may be made by adding water, preferably pure water. The concentration of the rare metal, which is included in the hydrochloric acid leaching liquid as flown, is preferably about 10 ppm.

The palladium contained in the hydrochloric acid leaching liquid is caused to be adsorbed in its total amount in the DHS-impregnated resin column 21. The residual liquid flowing from the DHS-impregnated resin column 21 is caused to flow into the ion-exchange resin column 22 for platinum (S6). Only the platinum is caused to be adsorbed in the ion-exchange resin column 22 for platinum. The residual liquid passing through the ion-exchange resin column 22 for platinum, i.e., the residual liquid from which the palladium and the platinum have been removed, is stored in the storage tank 23. Pure water is added from the pure water tank 24 into the storage tank 23 to adjust the concentration of the hydrochloric acid solution stored in the storage tank 23 so as to be 3 mol/L.

The hydrochloric acid solution stored in the storage tank 23 is caused to flow into the ion-exchange resin column 25 for rhodium, and then the waste liquid flowing from it is stored in the waste fluid storage tank 26 (S7). In particular, the rhodium has a low adsorption rate onto the resin, leading to a possible insufficient adsorption onto the resin. It is therefore preferable to carry out the step under the following conditions:

(1) the surface area of the ion-exchange resin (WA-21) is increased (the size of the resin is reduced);
(2) the volume of the ion-exchange resin (WA-21) is increased;
(3) the flow rate is decreased (preferably 0.2 mL/minute or less);
(4) the temperature is increased (preferably 25° C. or more, more preferably 50° C. or more).

In case where the lapsed time for the steps of S1 to S7 does not reach a predetermined time (S8), the hydrochloric acid is condensed by filtering the waste liquid stored in the waste fluid storage tank 26 in the hydrochloric acid condensing unit 27. The hydrochloric acid, as condensed, is caused to flow back to the leaching unit 1, and the system is caused to return to the step of S1 as described above (S9).

Palladium Elution Step, Platinum Elution Step and Rhodium Elution Step

An elution unit 3, which is used in the palladium elution step, the platinum elution step and the rhodium elution step by which the rare metal recovery method according to the embodiment of the present invention is comprised, includes, as shown in FIG. 4, a hydrochloric acid tank 31 for palladium that stores the hydrochloric acid solution containing thiourea of 0.01 mol/L to be flown into the DHS-impregnated resin column 21 on which the above-mentioned palladium has adsorbed; a palladium storage tank 32 that stores the hydrochloric acid solution containing the palladium, flowing from the DHS-impregnated resin column 21; a hydrochloric acid tank 33 for platinum that stores the hydrochloric acid solution of 1 mol/L to be flown into the ion-exchange resin column 22 for platinum on which the above-mentioned platinum has adsorbed; a platinum storage tank 34 that stores the hydrochloric acid solution containing the platinum, flowing from the ion-exchange resin column 22 for platinum; a hydrochloric acid tank 35 for rhodium that stores the hydrochloric acid solution of 1.7 mol/L to be flown into the ion-exchange resin column 23 for rhodium on which the above-mentioned rhodium has adsorbed; a rhodium storage tank 36 that stores the hydrochloric acid solution containing the rhodium, flowing from the ion-exchange resin column 23 for rhodium; and conduits that supplies liquid between the respective columns and/or the respective tanks.

Concerning the flow of the palladium elution step, the platinum elution step and the rhodium elution step in the structural system as described above, in case where the lapsed time for the steps of S1 to S7 reaches a predetermined time in Step S8 as described above in FIG. 1, the hydrochloric acid solution containing the thiourea is caused to flow from the hydrochloric acid tank 31 for palladium into the DHS-impregnated resin column 21 (S10). This flowing of the hydrochloric acid solution causes the hydrochloric acid solution containing the palladium and thiourea of 0.01 mol/L to be stored in the palladium storage tank 32. In addition, the hydrochloric acid solution is caused to flow from the hydrochloric acid tank 33 for platinum into the ion-exchange resin column 22 for platinum (S11). This flowing of the hydrochloric acid solution causes the hydrochloric acid solution of 1 mol/L containing the platinum to be stored in the platinum storage tank 34. In addition, the hydrochloric acid solution is caused to flow from the hydrochloric acid tank 35 for rhodium into the ion-exchange resin column 25 for rhodium (S12). This flowing of the hydrochloric acid solution causes the hydrochloric acid solution of 1.7 mol/L containing the rhodium to be stored in the rhodium storage tank 36. The respective columns 21, 22 of the DHS-impregnated resin and the ion-exchange resin for platinum, as well as the ion-exchange resin column 25 for rhodium are rinsed with pure water and the respective columns may be reused after the elution of the respective rare metals as adsorbed.

Palladium Precipitation Step, Platinum Precipitation Step and Rhodium Precipitation Step A precipitation unit 4, which is used in the palladium precipitation step, the platinum precipitation step and the rhodium precipitation step by which the rare metal recovery method according to the embodiment of the present invention is comprised, includes, as shown in FIG. 4, a sodium hydroxide tank 41 that stores a sodium hydroxide solution of 1 mol/L; a palladium precipitation tank 42 that stores precipitation of the palladium; an ammonium chloride tank 43 that stores a saturated ammonium chloride solution; a platinum precipitation tank 44 that stores precipitation of the platinum; a nitrous acid tank 45 that stores a nitrous acid solution of 1 mol/L; and a rhodium precipitation tank 46 that stores precipitation of the rhodium.

Concerning the flow of the palladium precipitation step, the platinum precipitation step and the rhodium precipitation step in the structural system as described above, the sodium hydroxide solution of 1 mol/L is added, after completion of the step of S12 as described above, to the palladium elution liquid stored in the palladium storage tank 32, as shown in FIG. 1 (S13). This adding causes the palladium, which is in an ionic state, to become neutralized to create a palladium oxide (precipitation). This precipitation is then removed. The residual liquid is the hydrochloric acid solution, which contains many kinds of metals such as aluminum, silicon, magnesium, tungsten, etc. Ninety-five percent (95%) or more of these metals may be separated by precipitation by heating the liquid in the waste liquid tank to vapor and condensing it to prepare a liquid, causing the thus prepared liquid to flow back to the waste liquid tank, and then neutralizing the liquid. A plant for carrying out these process steps will be referred to as the "recycling plant". The rare metal recovery method according to the present invention enables metals other than the rare metals, included in the waste liquid to be separated in an easy manner, thus improving the recycling rate of various kinds of metals.

After completion of step S13, the sodium hydroxide solution of 1 mol/L is added to the platinum elution liquid [containing platinum chloride ($PtCl_4$)] stored in the platinum storage tank 34 as described above (S14). This addition causes the platinum in ionic state to become neutralized to create a platinum oxide (precipitation) and this precipitation is removed. The residual liquid is treated by the recycling plant as described above. After completion of the step S14, the nitrous acid solution of 1 mol/L is added to the rhodium elution liquid stored in the rhodium storage tank 36 as described above (S15). This addition causes the rhodium, which is in an ionic state, to become neutralized to create a rhodium oxide (precipitation) and this precipitation is removed. The residual liquid is treated by the recycling plant as described above.

The liquid stored in the hydrochloric acid tank 33 for platinum and the hydrochloric acid tank 35 for rhodium is described as being hydrochloric acid. However, a mixed solution with sulfuric acid may be used. In case of mixing sulfuric acid, it is preferable to limit the concentration of the sulfuric acid to about 3 mol/L in view of recovery of the rhodium.

Experimental results of the present invention will be described as examples. However, the present invention is not restricted by these experiments.

EXAMPLES

Figure 5A:
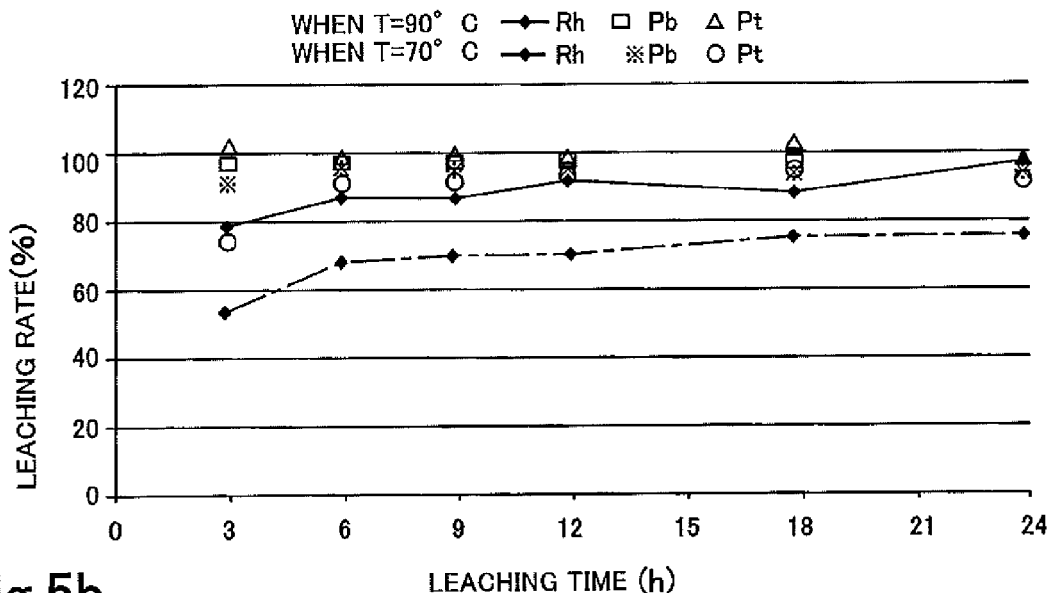
FIGS. 5a through 5c are a set of graphs showing results of a leaching experiment according to the rare metal recovery method of the present invention.
Figure 5B:
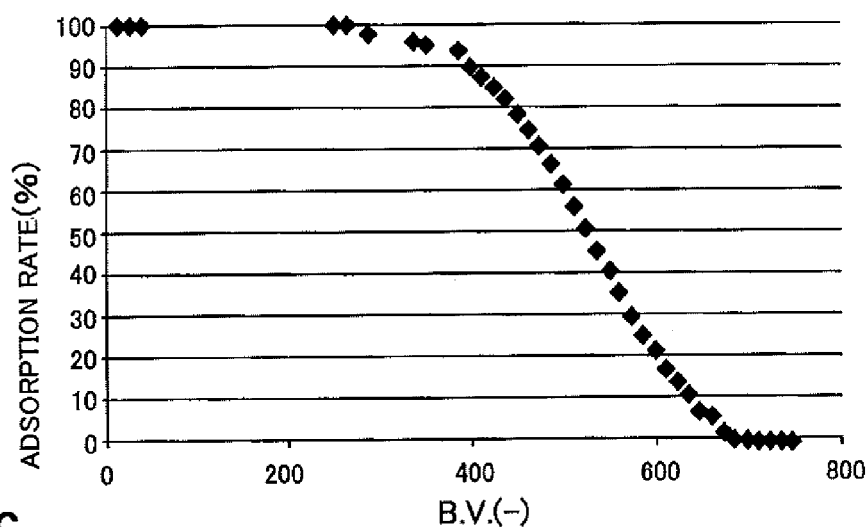
Figure 5C:
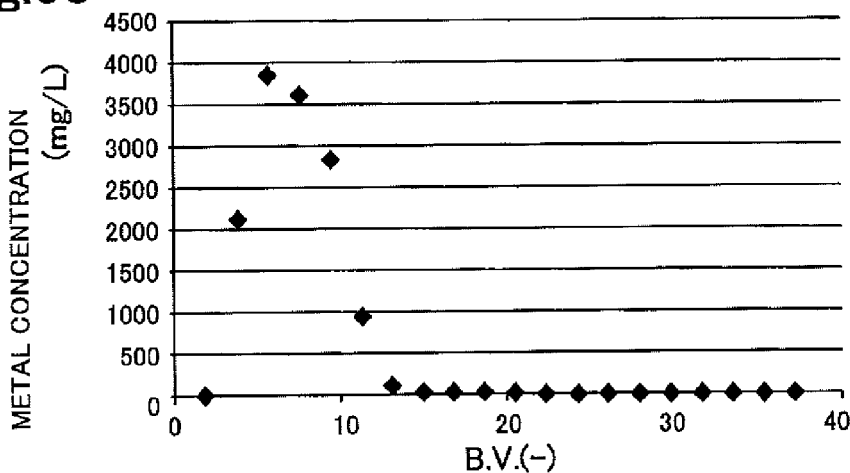
Figure 6A:
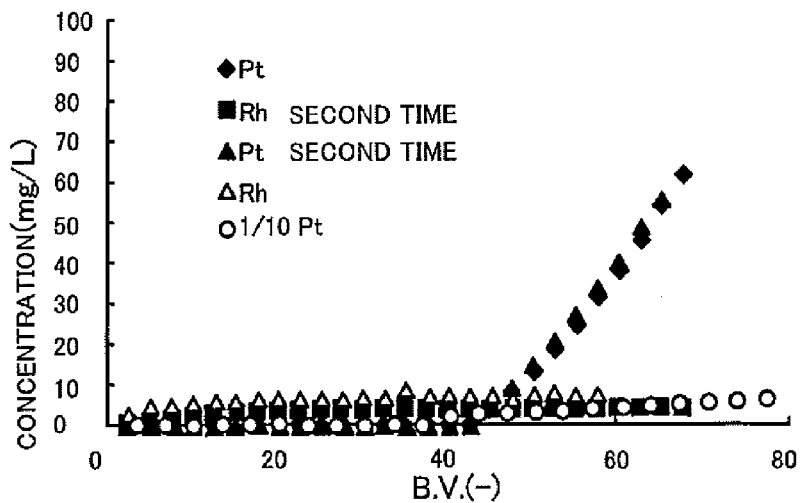
FIGS. 6a through 6c are a set of graphs showing results of recovery of platinum according to the rare metal recovery method of the present invention.
Figure 6B:
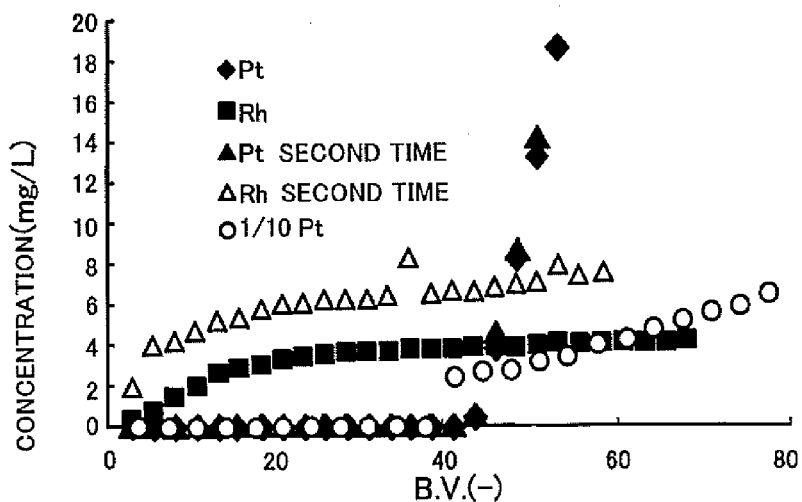
Figure 6C:
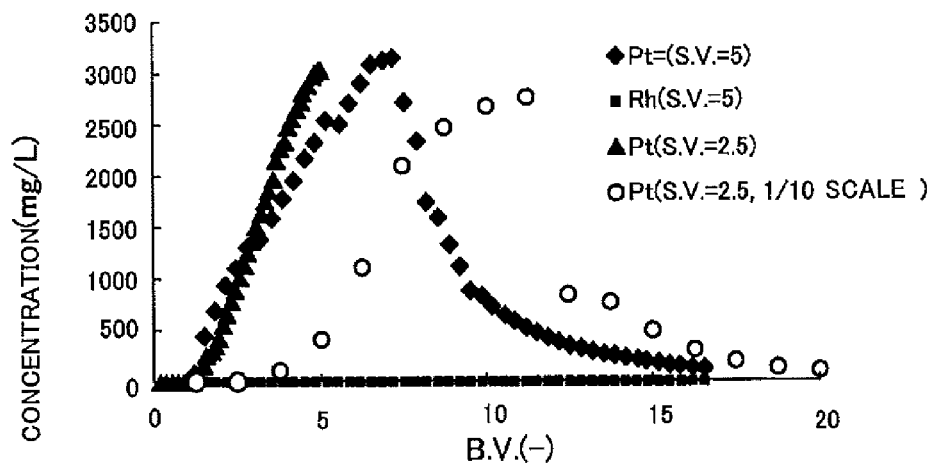
Figure 7A:
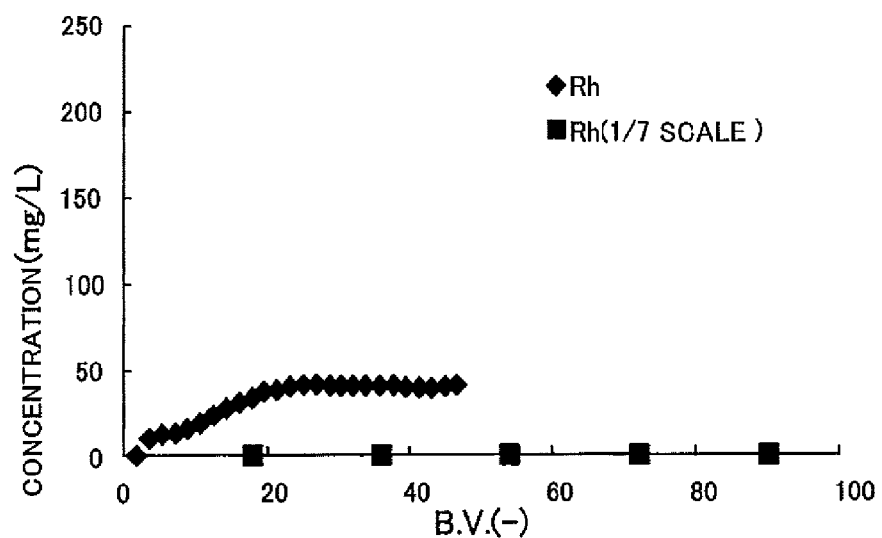
FIGS. 7a and 7b are a set of graphs showing results of recovery of rhodium according to the rare metal recovery method of the present invention.
Figure 7B:
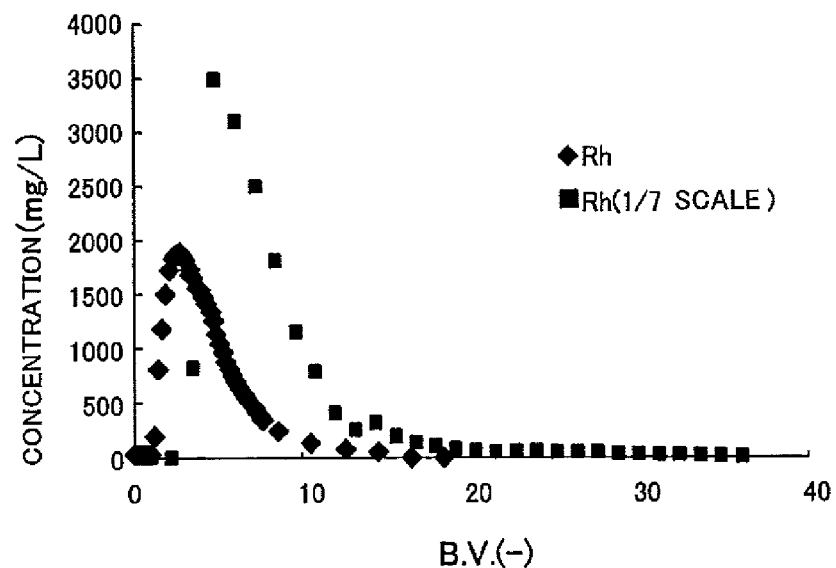
Figure 8A:
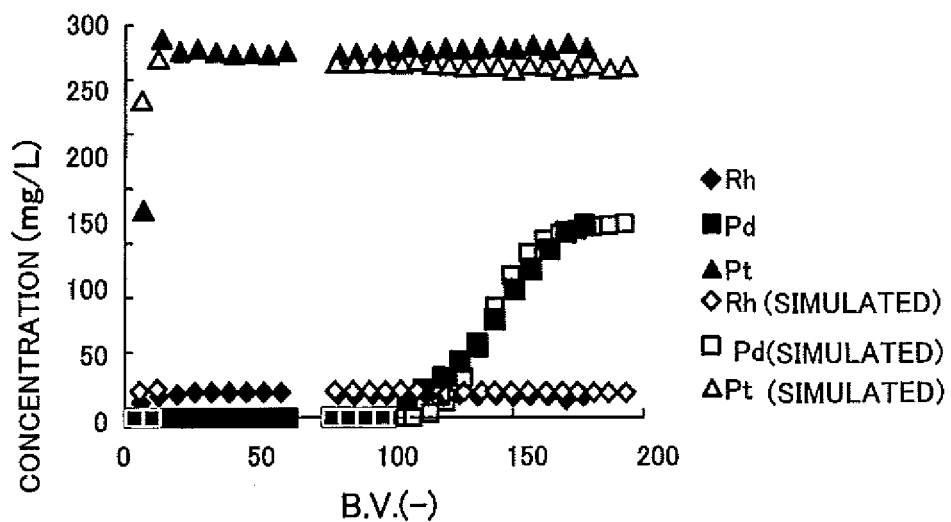
FIGS. 8a and 8b are a set of graphs showing results of recovery of palladium and results of a purity measurement according to the rare metal recovery method of the present invention.
Figure 8B:
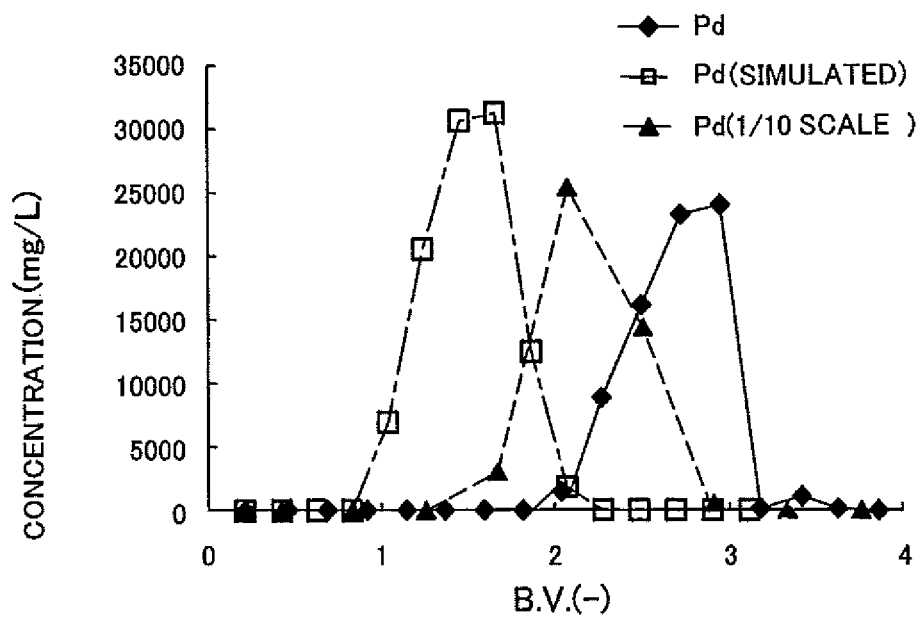

Results of the rare metal recovery made in accordance with the apparatus and method having the structure and process steps as described above will be set forth with reference to FIGS. 5 to 8. FIG. 5 shows results of the leaching experiment according to the rare metal recovery method of the present invention, FIG. 6 shows results of recovery of platinum according to the rare metal recovery method of the present invention, FIG. 7 shows results of recovery of rhodium according to the rare metal recovery method of the present invention, and FIG. 8 shows results of recovery of palladium and results of purity measurement according to the rare metal recovery method of the present invention.

Leaching Step

An automobile waste catalyst containing palladium, platinum and rhodium is immersed into the hydrochloric acid of 5 mol/L to leach the rare metals therein (Automobile waste catalyst:hydrochloric acid=2.5 g:50 ml). Concerning the leaching results, a leaching rate after a lapse of 24 hours at a temperature of 70° C. was about 80% or more, and especially the leaching rate at a temperature of 90 C was about 100%, as shown in FIG. 5(a).

Palladium Elution

A glass column having an inner diameter of 8 mm and a length of 100 mm was filled with the DHS-impregnated resin of 1.59 g in an amount of 4.8 mL (wet volume), and the waste catalyst (hydrochloric acid:5 mol/L, rhodium:8 mg/L, platinum:90 mg/L, palladium:53 mg/L) as described above was supplied into the above-mentioned glass column to cause the liquid to pass through the waste catalyst in a flow rate of 0.5 mL/minute. This liquid passing step was carried out in 400 BV (Bet volume). The value of BV was calculated based on an equation of "BV=(flow rate [ml/minute]×liquid flowing time [minute])/ (wet volume of adsorbent). The hydrochloric acid solution of 1 mol/L containing thiourea of 0.1 mol/L was caused to pass through the DHS-impregnated resin in 15 BV to elute the palladium during about two hours. In this case, the adsorption rate was 137 mg and the elution rate was 98%.

A correlation between the adsorption rate (%), the metal concentration (mg/L) and the BV was investigated. The results are shown in FIGS. 5(b) and (c). Concerning the liquid passing step as described above, a breakdown point of 10% exists in 400 BV, as shown in FIG. 5(b). It is therefore preferable to carry out the liquid passing step in 400 BV or less. Concerning the liquid passing step as described above, the concentration of the metal (palladium) becomes null in 15 BV or later, and 100% of the palladium is eluted. It is therefore recognized that about 15 BV suffices for elution.

Platinum and Rhodium Elution

A glass column having an inner diameter of 8 mm and a length of 100 mm was filled with the WA-21 in an amount of 5 mL (volume in wet), and the waste catalyst (hydrochloric acid:5 mol/L) as described above was supplied into the above-mentioned glass column to cause the liquid to pass through the waste catalyst in a flow rate of 0.5 mL/minute (SV=5). After adsorption of the platinum and rhodium, the liquid passing step was carried out in the order of the ion-exchange water:2 hours→hydrochloric acid solution of 1 mol/L containing thiourea of 0.1 mol/L:156 ml→the ion-exchange water:2 hours→hydrochloric acid solution of 1 mol/L: 184 ml. In this case, an amount of adsorption of the rhodium was 5.72 mg, the platinum, 22.5 mg. The elution rate of the platinum was 100%.

Platinum Recovery

A plastic column having an inner diameter of 20 mm and a length of 180 mm was filled with the WA-21 in an amount of 6.25 mL (volume in wet), and a simulated leaching liquid [Pt=270 mg/L, Rh=20 mg/L (SMHCL) was supplied into the above-mentioned column to cause the liquid to pass through it in a flow rate of 4.7 mL/minute. Then, the ion-exchange water was supplied for 1 hour and the elution step was carried out with the hydrochloric acid solution of 1 mol/L containing thiourea of 0.1 mol/L. Then, a rinsing step was carried out with the ion-exchange water, and the adsorption step and the elution step were repeated (SV=5). The thiourea after use was discarded and the hydrochloric acid was vaporized to condense the recovery solution. In addition, an adsorption experiment was made with the use of an actual waste liquid of Pt=93 mg/L in a 1/10 scale. The results were shown in FIG. 6. It was revealed from FIG. 6 that good recovery results of the platinum were obtained especially in a range of BV=40 or before.

Rhodium Recovery

A plastic column having an inner diameter of 15 mm and a length of 200 mm was filled with the ion-exchange resin WA-21 in an amount of 35.16 mL (wet volume), and a simulated leaching liquid (Rh=244 mg/L (SMHCL)) was supplied into the above-mentioned column to cause the liquid to pass through it in a flow rate of 0.7 mL/minute. Then, the ion-exchange water was supplied for 1 hour and the elution step was carried out with the nitrous acid of 5.0M (SV=1.2). In addition, an adsorption experiment was made with the use of an actual waste liquid of Rh=20 mg/L in a 1/7 scale. The actual waste liquid was heated by a heater as a pretreatment for the adsorption. The results are shown in FIG. 7. It was revealed from FIG. 7 that good recovery results of the rhodium were obtained especially in a range of BV=20 or before.

Palladium Recovery

An actual catalyst (containing Pd, Rt and Rh) of 500 g was immersed into the hydrochloric acid of 5 L at a temperature of 70° C. In a simulated case, a plastic column having an inner diameter of 20 mm and a length of 180 mm was filled with the DHS-impregnated resin of 16.77 g in an amount of 50.63 mL (wet volume), and a simulated leaching liquid (Pd=150 mg/L, Rt=270 mg/L, Rh=20 mg/L (SMHCL)) was supplied into the above-mentioned column to cause the liquid to pass through it in a flow rate of 5.75 mL/minute (SV=6.2). Then, the ion-exchange water was supplied for 1 hour and an ammonia water was supplied (SV=6.8). The ammonia water after use was neutralized.

Measurement of Degree of Purity

The metals provided by the elution liquids obtained through the leaching liquid as described above, i.e., Pt=0.1680 g and Pd=0.7508 g were heated at a temperature of 70° C. for 12 hours in aqua regia of 50 mL. The solution of the platinum in a constant volume of 100 mL was diluted twentyfold and then the concentration was measured. The measured value was 99.99% or more in 83.923 mL, thus permitting an extremely high purity.

REFERENCE SIGNS LIST 1 leaching unit
10 hydrochloric acid tank
11 raw material inlet
12 motor
12a agitator
13 leaching liquid tank
13a tank heating unit
14 heating unit
15 drain separator
16 condenser
17 cooling tower
18 pressure unit
2 adsorption unit
21 DHS-impregnated resin column
22 ion-exchange resin column for platinum
23 storage tank
24 pure water tank
25 ion-exchange resin column for rhodium
26 waste fluid storage tank
27 hydrochloric acid condensing unit
3 elution unit
31 hydrochloric acid tank for palladium
32 palladium storage tank
33 hydrochloric acid tank
34 platinum storage tank 35 hydrochloric acid tank for rhodium
36 rhodium storage tank
4 precipitation unit
41 sodium hydroxide tank
42 palladium precipitation tank
43 ammonium chloride tank
44 platinum precipitation tank
45 nitrous acid tank
46 rhodium precipitation tank

The invention claimed is:

1. A rare metal recovery method, which comprises:
    mixing, under a pressure of 1 atmosphere or less at a temperature of from 50° C. to 90° C., a hydrochloric acid mixture liquid obtained by mixing a waste material of rare metal comprising palladium, platinum and rhodium with hydrochloric acid to form hydrochloric acid vapor;
    condensing the hydrochloric acid vapor obtained by said mixing to form hydrochloric acid liquid
    flowing the hydrochloric acid liquid back to the hydrochloric acid mixture liquid to prepare a hydrochloric acid leaching liquid; and
    recovering the rare metal from the hydrochloric acid leaching liquid.

2. The rare metal recovery method, as claimed in claim 1, further comprising:
    a palladium adsorption step of causing the hydrochloric acid leaching liquid to pass through a palladium adsorbent impregnated with adsorbent for adsorbing the palladium and causing the palladium to adsorb on the palladium adsorbent;
    a platinum adsorption step of causing a residual liquid from said palladium adsorption step to pass through a platinum adsorbent impregnated with adsorbent for adsorbing the platinum and causing the platinum to adsorb on the platinum adsorbent; and
    a rhodium adsorption step of causing a residual liquid from said platinum adsorption step to pass through a rhodium adsorbent impregnated with adsorbent for adsorbing the rhodium and causing the rhodium to adsorb on the rhodium adsorbent.

3. The rare metal recovery method, as claimed in claim 2, further comprising:
    a hydrochloric acid reuse step of condensing a residual liquid from said rhodium adsorption step; and flowing a hydrochloric acid solution obtained by said condensing back to said hydrochloric acid mixture liquid.

4. The rare metal recovery method, as claimed in claim 2, further comprising:
    a palladium elution step of causing a hydrochloric acid solution containing thiourea to pass through said palladium adsorbent and eluting the palladium to prepare a palladium elution liquid including the palladium;
    a platinum elution step of causing a hydrochloric acid solution to pass through said platinum adsorbent and eluting the platinum to prepare a platinum elution liquid including the platinum; and
    a rhodium elution step of causing a hydrochloric acid solution to pass through said rhodium adsorbent and eluting the rhodium to prepare a rhodium elution liquid including the rhodium.

5. The rare metal recovery method, as claimed in claim 4, further comprising:
    a palladium precipitation step of adding a sodium hydroxide solution to the palladium elution liquid obtained by said palladium elution step to precipitate a palladium oxide;
    a platinum precipitation step of adding a saturated ammonium chloride solution to the platinum elution liquid obtained by said platinum elution step to precipitate a platinum oxide; and
    a rhodium precipitation step of adding a nitrous acid solution to the rhodium elution liquid obtained by said rhodium elution step to precipitate a rhodium oxide.

6. The rare metal recovery method, as claimed in claim 2, wherein said palladium adsorbent comprises a di-n-hexyl sulfide (DHS)-impregnated resin.

7. The rare metal recovery method, as claimed in claim 2, wherein said platinum adsorbent and said rhodium adsorbent comprise an ion-exchange resin.

* * * * *